United States Patent
Song et al.

(10) Patent No.: US 6,521,382 B1
(45) Date of Patent: Feb. 18, 2003

(54) METHOD OF PREPARING POLYMER ELECTROLYTE COMPOSITION AND METHOD OF MANUFACTURING LITHIUM SECONDARY BATTERY USING THE SAME

(75) Inventors: Jung Min Song, Gyeonggi-do (KR); Hee Tak Kim, Suwon-si (KR); Sun Wook Kim, Seoul (KR)

(73) Assignee: Ness Energy Co., Ltd., Suwon-si (KR)

( * ) Notice: Subject to any disclaimer, the term of this patent is extended or adjusted under 35 U.S.C. 154(b) by 102 days.

(21) Appl. No.: 09/709,463

(22) Filed: Nov. 13, 2000

Related U.S. Application Data

(63) Continuation-in-part of application No. 09/484,535, filed on Jan. 18, 2000, now Pat. No. 6,403,266.

(51) Int. Cl.[7] .............................................. H01M 10/40
(52) U.S. Cl. ........................ 429/309; 429/314; 429/316; 429/322
(58) Field of Search ................................. 429/309, 314, 429/316, 330, 331, 338, 322

(56) References Cited

U.S. PATENT DOCUMENTS 6,299,653 B1 * 10/2001 Hoshi et al. ............... 29/623.1
6,355,380 B1 * 3/2002 Yun et al. .................. 429/306

* cited by examiner

*Primary Examiner*—Laura Weiner
(74) *Attorney, Agent, or Firm*—Jacobson Holman PLLC

(57) ABSTRACT

Disclosed are a method of preparing a polymer electrolyte composition and a method of manufacturing a lithium secondary battery employing the same. A polymer mixture including a) a polymer mixture including polyvinylidene fluoride-based polymer and b) at least one polymer selected from the group consisting of polyacrylonitrile and polymethyl methacrylate are mixed with a solvent in which a lithium salt is dissolved. The mixing ratio of the polymer mixture and the solvent is 1: 3–10. Thus obtained first mixture is stirred at a room temperature for 1–48 hours. Then, thus obtained second mixture is heated at 60–250° C. for 5 minutes–6 hours while stirring to prepare a polymer electrolyte composition. This composition is coated on at least one substrate selected from a group consisting of a molded film, an anode and a cathode and then dried. The polymer electrolyte has a good mechanical strength and the lithium secondary battery has a stable charge/discharge characteristic and a high capacity.

5 Claims, 5 Drawing Sheets

METHOD OF PREPARING POLYMER ELECTROLYTE COMPOSITION AND METHOD OF MANUFACTURING LITHIUM SECONDARY BATTERY USING THE SAME

This is a continuation-in-part of U.S. Pat. Ser. No. 09/484,535 filed on Jan. 18, 2000, which is now U.S. Pat. No. 6,403,266.

BACKGROUND OF THE INVENTION

1. Field of the Invention

The present invention relates to a method of preparing a polymer electrolyte composition and a method of manufacturing a lithium secondary battery using the same. In particular, the present invention relates to a method of preparing a polymer electrolyte composition and a method of manufacturing a lithium secondary battery using the same which has a high ionic conductivity, good mechanical properties, a stable interface characteristic, a good discharging characteristic at a high and low temperature and an efficient discharging characteristic.

2. Description of the Related Art

There has been a great deal of interest in developing better and more efficient methods for storing energy for applications such as cellular communication, satellites, portable computers and electric vehicles. In particular, great effort has been dedicated to the development of a lithium ion battery having a cathode including lithium, an anode including lithium or carbon and a non-aqueous electrolyte, because of its higher energy density than that of a lead storage battery or nickel-cadmium battery having an aqueous electrolyte.

Recently, the widely used lithium ion battery having a satisfactory ionic conductivity uses a liquid electrolyte, however, the leakage of the liquid electrolyte occurs frequently. Moreover, any leakage in the cell lessens the performance of the battery. Accordingly, lithium ion batteries are packed with an aluminum can and are provided with various protective devices, thereby enlarging the volume of the cell and reducing the energy density to an undesirable degree. Furthermore, such a lithium ion battery is not applicable to a battery having thickness of 3 mm or less.

In contrast, solid electrolytes are free from problems like leakage, however, these solid electrolytes tend to exhibit inferior properties compared to the liquid electrolytes. This is due to the fact that ionic conductivities for the solid electrolytes are often 5–100 times inferior to that of the liquid electrolytes.

In general, a polymer lithium secondary battery includes an anode, a polymer electrolyte and a cathode. The components are selected to satisfy various conditions of the secondary battery such as lifetime, capacity, temperature characteristic, stability, etc.

As for the components of the cathode applied to the secondary battery, lithium oxide complex ($LiCoO_2$, $LiMn_2O_4$, $LiNiO_2$) which has a laminated structure and lithium ion which can be inserted between layers or separated from layers can be used. As for the components of the anode, carbon compounds such as graphite compounds or coke can be used and these are examples of which include mesocarbon microbeads (MCMB) and mesophase carbon fiber (MPCF).

A polymer electrolyte which is widely used as a main component of the lithium battery is free from the leakage problem. The manufacturing of the battery using the polymer electrolyte does have some advantages however, the polymer electrolyte is required to have a good ionic conductivity, a thermal and electrochemical stability, a good mechanical strength and a good adhesiveness to the electrodes.

The polymer electrolytes which is currently used or which is under development include a main liquid-type organic solvent such as ethylene carbonate and propylene carbonate, a vice liquid-type organic solvent such as dimethyl carbonate, diethyl carbonate and ethyl methyl carbonate, and polyvinylidene difluoride-based compounds (PVdF), polyacrylonitriles (PAN), polyethylene oxides, a copolymer thereof or a mixture thereof which can accept lithium salts such as $LiPF_6$ and $LiAsF_6$.

The polymer electrolyte including the polyvinylidene fluoride compounds has a good mechanical strength. However, the adhesiveness to the electrodes is not sufficient and this requires an adhering process using heat or pressure. The solvent might evaporate during the adhering process of the electrodes to the electrolyte. Thus, films which do not contain the electrolyte are adhered to the electrodes and then additional impregnation process is implemented to the solvent.

When polyacrylate polymer electrolytes having good affinity to the solvent are used in order to increase the adhesiveness to the electrodes, it can be accomplished, however, the mechanical strength of the electrolyte is not good.

One class of polymer electrolytes, especially, gel electrolytes in which liquid electrolyte is dispersed in a polymer matrix, includes a significant fraction of solvents in addition to the salt contained in the polymer matrix.

A method for preparing the gel electrolytes is disclosed in U.S. Pat. No. 5,456,000. A battery is assembled with a gel electrolyte to leave the electrolyte salt and solvent out of the polymer gel system until after the cell is completely fabricated. Thereafter, the solvent and the electrolyte salt may be introduced to the polymer system in order to swell the battery. This battery has an advantage of allowing the cell to be fabricated in a non-dry environment. However, a film is formed from a polymer containing a plasticizer in order to facilitate the impregnation of the polymer film with the solvent. As a result, the battery is assembled, the plasticizer is then extracted to form a micro-porous film and the solvent used for the extraction is evaporated. Such a process requires homogeneous impregnation of the polymer with the solvent and also requires many hours to lengthen the processing time.

In order to overcome the above-described problem, U.S. Pat. No. 5,219,679 discloses a method of preparing a polymer electrolyte after mixing the polymer and the liquid electrolyte. In this method, the solvent is already homogeneously dispersed into the polymer prior to the assembling of a battery. An additional process of extracting a plasticizer or drying is not necessary, however, the preparation of the polymer electrolyte and the assembling of the cell should be implemented under a dry condition. Furthermore, if the polymer electrolyte contains a large amount of solvent, the mechanical strength is poor. This makes a continuous processing being difficult and the electrical short being liable to generate.

U.S. Pat. Nos. 5,585,039, 5,639,573, 5,716,421 and 5,688,293 disclose polymer electrolytes prepared by filling polymer electrolytes into porous films which is good enough to overcome the problems of the mechanical strength. According to the method introduced in these patents, a filling process or a coating process of the electrolyte into or onto the porous film is additionally implemented, thus complicating the manufacturing process of the battery.

Therefore, it is preferred that a gel polymer electrolyte containing a polymer and a solvent is prepared, then an anode, a cathode and a polymer electrolyte obtained accordingly are integrated to manufacture the battery, which simplifies the manufacturing process of the battery.

In this case, since only one coating process is necessary for preparing the polymer electrolyte, the ionic conductivity, mechanical strength of the polymer and the solvent mixture and the interface adhesiveness to the electrodes are anticipated to exhibit good qualities. Since the polymer electrolyte impregnated with the solvent is integrated, a lamination method at a high temperature cannot be used. Accordingly, the polymer electrolyte should have good interface adhesiveness to the electrodes.

U.S. Pat. No. 5,849,433 discloses a method for preparing a polymer electrolyte using a material which has a good mechanical strength and adhesiveness in order to improve the mechanical properties. According to the method, the polymer electrolyte is prepared by forming a film from a mixture of materials having a good mechanical strength and adhesiveness to obtain a desired polymer electrolyte and by impregnating the film with a liquid electrolyte.

However, in this method, additional impregnation process of the polymer film with the liquid electrolyte is necessary to manufacture the polymer electrolyte.

SUMMARY OF THE INVENTION

It is an object of the present invention to provide a method of preparing a polymer electrolyte composition having a good mechanical strength and a good adhesiveness.

Another object of the present invention is to provide a method of manufacturing a lithium secondary battery which employs the polymer electrolyte composition having a good mechanical strength and a good adhesiveness.

To accomplish these objects, a method of preparing a polymer electrolyte composition is provided in the present invention. A polymer mixture including a) a polymer mixture which includes polyvinylidene fluoride-based polymer and b) at least one polymer selected from the group consisting of polyacrylonitrile and polymethyl methacrylate is mixed with a solvent in which a lithium salt is dissolved. The mixing ratio of the polymer mixture and the solvent is in the range of about 1:3–10. The obtained first mixture is stirred at a room temperature for about 1–48 hours. Then, the mixture obtained accordingly is heated at a temperature of about 60–250° C. for about 5 minutes–6 hours while stirring.

Another object of the present invention is accomplished by the following method of manufacturing a lithium secondary battery. A polymer mixture including a) a polymer mixture which includes polyvinylidene fluoride-based polymer and b) at least one polymer selected from the group consisting of polyacrylonitrile and polymethyl methacrylate is mixed with a solvent in which a lithium salt is dissolved. A mixing ratio of the polymer mixture and the solvent is in the range of about 1:3–10. Thus obtained first mixture is stirred at a room temperature for about 1–48 hours. The mixture obtained accordingly is heated at a temperature of about 60–250° C. for about 5 minutes–6 hours while stirring to prepare a polymer electrolyte composition. Then, the obtained polymer electrolyte composition is coated onto at least one substrate selected from a group consisting of a molded film, an anode and a cathode and then the composition is dried.

Polyvinylidene fluoride-based polymer includes a large amount of electrolyte and lithium salts and provides a good mechanical strength. Polymethyl methacrylate polymer has a good affinity to the solvent which adheres the electrolyte strongly to the electrodes. Polyacrylonitrile polymer has a good adhesiveness to the electrolyte, thus it improves the adhesiveness of the electrolyte to the electrodes without deteriorating the excellent mechanical properties of the polyvinylidene fluoride-based polymer.

According to the present invention, as a lithium secondary battery is manufactured by employing a polymer electrolyte, that is, prepared by an optimized method, a mechanical strength thereof is improved and an affinity of the electrolyte with the solvent can be improved to minimize the leakage and evaporation of the solvent in the polymer electrolyte. As a result, a lithium secondary battery having a stable charge/discharge characteristic and a high capacitance can be manufactured. Furthermore, since the electrolyte of the present invention has a good adhesiveness to the electrodes, a contacting resistance of thus obtained battery is small and a local concentration of a current can be prevented to improve the performance of the battery during charge/discharge thereof.

BRIEF DESCRIPTION OF THE DRAWINGS

The above objects and advantages of the present invention will become more apparent by describing preferred embodiments in detail with reference to the attached drawings in which.

DESCRIPTION OF THE PREFERRED EMBODIMENT

Figure 1:
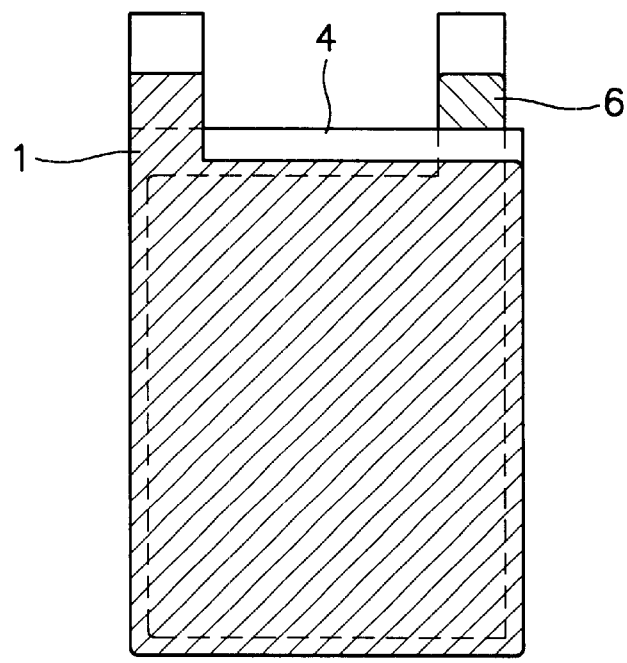
FIG. 1 is a schematic diagram for showing a planar structure of a lithium secondary battery manufactured by an embodiment of the present invention.

The present invention will be explained in more detail below.

The polymer electrolyte of the present invention is obtained by mixing a polymer mixture and a solvent. The polymer mixture includes a first polymer selected from the group consisting of polyvinylidene fluoride (PVdF) and a copolymer thereof, and a second polymer selected from the group consisting of polymethyl methacrylate (PMMA) and polyacrylonitrile.

As for the polymer, the preferred polymethyl methacrylate has a molecular weight in the range of about 100,000–2,000,000 and a poly disperse index in the range of 1–4. Preferred polyacrylonitrile and polyvinylidene fluoride have molecular weights in the range of about 50,000–1,000,000 and poly disperse indexes in the range of 1–4.

As for the polyvinylidene fluoride copolymer, the preferred additional amount of hexafluoropropane is about 2–30% by weight based on the total amount of the copolymer. It is preferred that the molecular weight of polyvinylidene fluoride-co-hexafluoropropane(PVdF-HFP) is in the range of about 50,000–1,000,000 and the poly disperse index is in the range of 1–4.

If the molecular weights of the above-described polymers are less than the minimum values, the mechanical intensities of thus obtained batteries become poor and if the molecular weights of the polymers are greater than the maximum values, the viscosities of the polymer electrolyte solutions increase and the manufacturing of films becomes difficult.

When the polymer mixture is obtained by mixing polyvinylidene fluoride and polymethyl methacrylate, and when the amount of polyvinylidene fluoride is 50% or less by weight based on the total amount of the mixture, the mechanical strength decreases and when the amount of polymethyl methacrylate is 10% or less by weight based on the total amount of the mixture, the adhesiveness to the electrodes deteriorates to separate the electrodes and the electrolyte or to evaporate the solvent during an adhering process.

Accordingly, the preferred amount of polyvinylidene fluoride is in the range of 50–90% by weight and that of polyacrylate-based polymer is in the range of 50–10% by weight.

After obtaining the polymer mixture, about 2–50% of silicon oxide by weight ($SiO_2$), zeolite and aluminum oxide ($Al_2O_3$) can be added.

When the polymer mixture is obtained by mixing polyacrylonitrile and polyvinylidene fluoride, the preferred amount of polyacrylonitrile is 50–75% by weight and that of polyvinylidene fluoride is 50–25% by weight. If the amount of polyacrylonitrile is less than 50% by weight, the adhesiveness between the electrodes and electrolyte is lowered and if the amount of polyacrylonitrile is above 75% by weight, mechanical strength is lowered.

When the polymer mixture is obtained by mixing polyvinylidene fluoride copolymer and polymethyl methacrylate, the preferred amount of polyvinylidene fluoride copolymer is 50–90% by weight and that of polymethyl methacrylate is 50–10% by weight. If the amount of polyvinylidene fluoride copolymer is less than 50% by weight, the mechanical strength is lowered and if that of polymethyl methacrylate is less than 10% by weight, the adhesiveness between the electrodes and the electrolyte is lowered to cause separation of the electrodes and the electrolyte during the adhering process or to cause evaporation of the solvent.

The polymer mixture can be obtained by mixing polyvinylidene fluoride, polyvinylidene fluoride copolymer and polymethyl methacrylate or obtained by mixing polyvinylidene fluoride, polymethyl methacrylate and polyacrylonitrile.

If the polymer mixture is obtained by mixing polyvinylidene fluoride, polyvinylidene fluoride copolymer and polymethyl methacrylate, the preferred amount of polyvinylidene fluoride and polyvinylidene fluoride copolymer is in the range of 50–90% by weight and that of polymethyl methacrylate is in the range of 50–10% by weight. At this time, the preferred amount of polyvinylidene fluoride is 40% or less by weight based on the total amount of polyvinylidene fluoride and polyvinylidene fluoride copolymer.

Polyvinylidene fluoride improves the mechanical strength of the polymer electrolyte and facilitates the impregnation of the electrodes with the solvent. If the amount of polyvinylidene fluoride is out of the given range, the adhesiveness between the electrodes and the electrolyte becomes too weak and they are liable to separate.

When the polymer mixture is obtained by mixing polyvinylidene fluoride, polymethyl methacrylate and polyacrylonitrile, the preferred amount of polyvinylidene fluoride is 25–50% by weight and that of polymethyl methacrylate and polyacrylonitrile is 50–75% by weight. At this time, the amount of polymethyl methacrylate is 30% or less by weight based on the total amount of polymethyl methacrylate and polyacrylonitrile. If the amount of polymethyl methacrylate is out of the given range, the mechanical strength of the polymer electrolyte is lowered and the electric short of a battery occurs easily.

As for the solvents which are used for the polymer electrolyte, ethylene carbonate (EC), propylene carbonate (PC), diethyl carbonate (DEC), dimethyl carbonate (DMC), ethyl methyl carbonate (EMC), gamma-caprolactone ($\gamma$-BL) and a mixture thereof can be exemplified. The preferred mixing ratio of the polymer mixture and the solvent is in the range of 1:3–10, more preferably, it is in the range of 1:4–8. If the mixing ratio of the polymer mixture is over the upper limit, the adhesiveness and ionic conductivity are decreased even if a good mechanical strength is accomplished. If the mixing ratio of the polymer mixture is less than the lower limit, the mechanical strength of the polymer electrolyte is lowered.

In order to increase the discharge capacitance at a low temperature, it is preferred that the amount of ethylene carbonate is less than 50% by weight based on the total amount of the solvent. If the amount of ethylene carbonate is less than 20% by weight, the dissociation degree of a salt decreases. Therefore, it is preferred that the amount of ethylene carbonate is about 20–50% by weight based on the total amount of the solvent.

Ethyl methyl carbonate, diethyl carbonate and dimethyl carbonate can prevent the crystallization of ethylene carbonate and lower the viscosity of the solvent in order to improve the characteristics at low temperature. The preferred amount of ethyl methyl carbonate, diethyl carbonate and dimethyl carbonate is in the range of 20–70% by weight based on the total amount of the solvent. If the amount is over 70% by weight, volatilization occurs at a high temperature.

In order to control the mechanical strength, the adhesiveness and ionic conductivity of the polymer electrolyte, a solvent which does not lower the characteristics at a low temperature while controlling the polarity of the solvent, is required. Propylene carbonate and gamma-caprolactone ($\gamma$-BL) satisfy these requirements. Even though viscosities of these solvents are higher than those of ethyl methyl carbonate, diethyl carbonate and dimethyl carbonate, melting points are lower than those of the three solvents to restrain crystallization at a low temperature and to give a good dissociation degree of salts. Accordingly, it is preferred that propylene carbonate and -BL are added to ethylene carbonate, or added to a mixture of ethyl methyl carbonate, diethyl carbonate and dimethyl carbonate to control the properties of the polymer electrolyte.

The preferred amount of propylene carbonate and γ-BL are in the range of 5–40% by weight based on the total amount of the solvent.

As for the lithium salt, 0.5–2M of lithium perchlorate ($LiClO_4$), lithium trifluoromethane sulfonate ($LiCF_3SO_3$), lithium borofluoride ($LiBF_4$), lithium hexafluorophosphate ($LiPF_6$), lithium arsenic hexafluoride ($LiAsF_6$) or a mixture thereof are exemplified. At this time, $LiPF_6$ is advantageous for improving the ionic conductivity and $LiClO_4$ is advantageous for increasing the lifetime of the battery.

When the polymer mixture and the electrolyte are mixed to prepare the polymer electrolyte in which each phase is separated, the mechanical strength can be largely increased compared to the conventional polymer electrolyte in which a polymer mixture and a solvent are homogeneously mixed.

The method for preparing the polymer electrolyte using the polymer mixture is as follows.

The polymer mixture and an electrolyte including the salt are mixed in a mixing ratio of about 1:3–10 at room temperature to obtain a homogeneous mixture. Thus obtained mixture is stirred for about 1–48 hours at room temperature. The stirring process of the mixture is implemented for homogeneous mixing of the polymer with the solvent. If the mixing time is less than 1 hour, large amount of clusters of the polymer occurs and homogeneous mixture cannot be obtained after the subsequent heating. Therefore, the stirring is implemented for at least 1 hour. After repeated experiments implemented by the present inventors, it is found out that a sufficient homogeneous mixture can be obtained by stirring for 48 hours, so any further stirring is a waste of time. Therefore, the preferred stirring period at room temperature falls in the range of 1–48 hours.

The obtained mixture is heated at about 60–250° C. for about 5 minutes–6 hours while stirring to obtain a viscous polymer electrolyte composition. If the heating temperature is lower than 60° C. or if the heating period is less than 5 minutes, the polymer is not readily dissolved and thus obtained composition does not give any film or the composition gives a poor film having a portion which has large amount of polymer. This portion functions as a barrier of an ion transmission and deteriorates an ionic conductivity. Furthermore, a cell resistance is increased to reduce a high current characteristic.

If the heating temperature is higher than 250° C. or if the heating period is longer than 6 hours, a decomposition of the polymer is generated and the mechanical strength of thus formed polymer film is reduced. When this film is used in manufacturing a cell, an electric short is possibly generated due to a contact of a cathode and an anode. Therefore, the heating temperature and the heating period should be in the above-described ranges. More preferably, the heating is implemented at 80–200° C. for 30 minutes–5 hours.

The method of manufacturing a lithium secondary battery using the polymer electrolyte composition prepared by the above-mentioned process will be described below.

The polymer electrolyte composition can be applied to an electrode by the following two methods.

First, the polymer electrolyte composition is coated on a molded film, which can be easily separated from a polymer electrolyte and which has no reactivity, and is dried to form a film. An electrode is attached between two films in order to attach the polymer electrolytes on both sides of the electrode. At this time, the obtained polymer electrolyte includes an organic solvent which contains an ionic salt as a medium for transmitting ion and which exhibits a good mechanical strength along with a homogeneous adhesiveness to the electrode.

In order to increase the mechanical strength of the polymer electrolyte, the polymer electrolyte composition is coated to the molded film and then dried at a temperature range of from room temperature to 60° C. for a minute to an hour before the attaching to the electrode. If the drying temperature is higher than 60° C. or the drying period is longer than an hour, most of the solvent at the surface of the polymer electrolyte weakens the adhesiveness of the polymer electrolyte with the electrode during the manufacturing of a unit cell or a multi-layered cell as the solvent is too dried. As a result, a contact resistance of the polymer electrolyte and the electrode is increased. Furthermore, the evaporation of the solvent from the electrolyte results in the reduction of an ionic conductivity of the polymer electrolyte to deteriorate a high current characteristic. Accordingly, the preferred drying condition should be in the above-described ranges and the preferred thickness of the coated polymer composition is about 20–100 μm.

From this manufactured polymer electrolyte/anode/polymer electrolyte (or polymer electrolyte/cathode/polymer electrolyte) system, one molded film is taken off and a cathode (or an anode) is attached to the exposed polymer electrolyte in order to manufacture a basic structure of a unit cell. The integrated structure of this unit cell is polymer electrolyte/anode/polymer electrolyte/cathode (or polymer electrolyte/cathode/polymer electrolyte/anode). If a manufacturer wants to make a unit cell, the opposite polymer electrolyte is removed to manufacture an anode/polymer electrolyte/cathode system.

Alternately, the polymer electrolyte composition can be directly coated to the cathode or the anode and can be dried to manufacture a polymer electrolyte film without using the molded film. At this time, the components of the polymer electrolyte penetrate into the pores of the electrode in order to improve the ion transmission at the electrode and a homogeneous interface of the electrode and the polymer electrolyte can be formed. The drying condition is the same with that applied for the method using the molded film. The temperature is in the range of from room temperature to 60° C. and the drying period is in the range of a minute to an hour. The preferred coating thickness of the composition is about 20–100 μm. The method for manufacturing the integrated structure of the cell is the same with that using the molded film.

The structure of thus obtained cells will be described with reference to attached FIGS. 1 to 3.

FIG. 1 is a schematic diagram for showing a planar structure of a lithium secondary battery manufactured by an embodiment of the present invention. FIG. 2 is a schematic diagram for showing a structure of a unit cell of a lithium secondary battery manufactured by an embodiment of the present invention. FIG. 3 is a schematic diagram for showing a lithium secondary battery having a multi-layered structure manufactured by an embodiment of the present invention.

Figure 2:
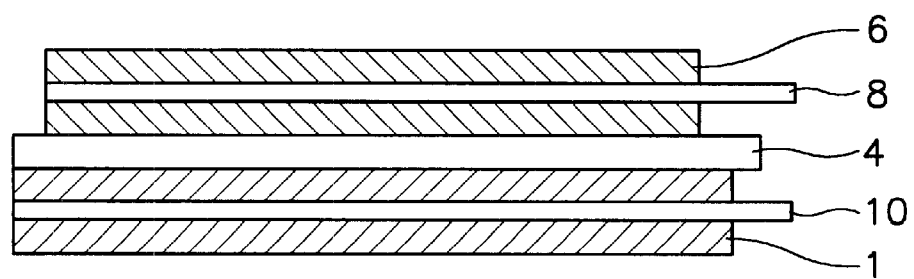
FIG. 2 is a schematic diagram for showing a structure of a unit cell of a lithium secondary battery manufactured by an embodiment of the present invention.
Figure 3:
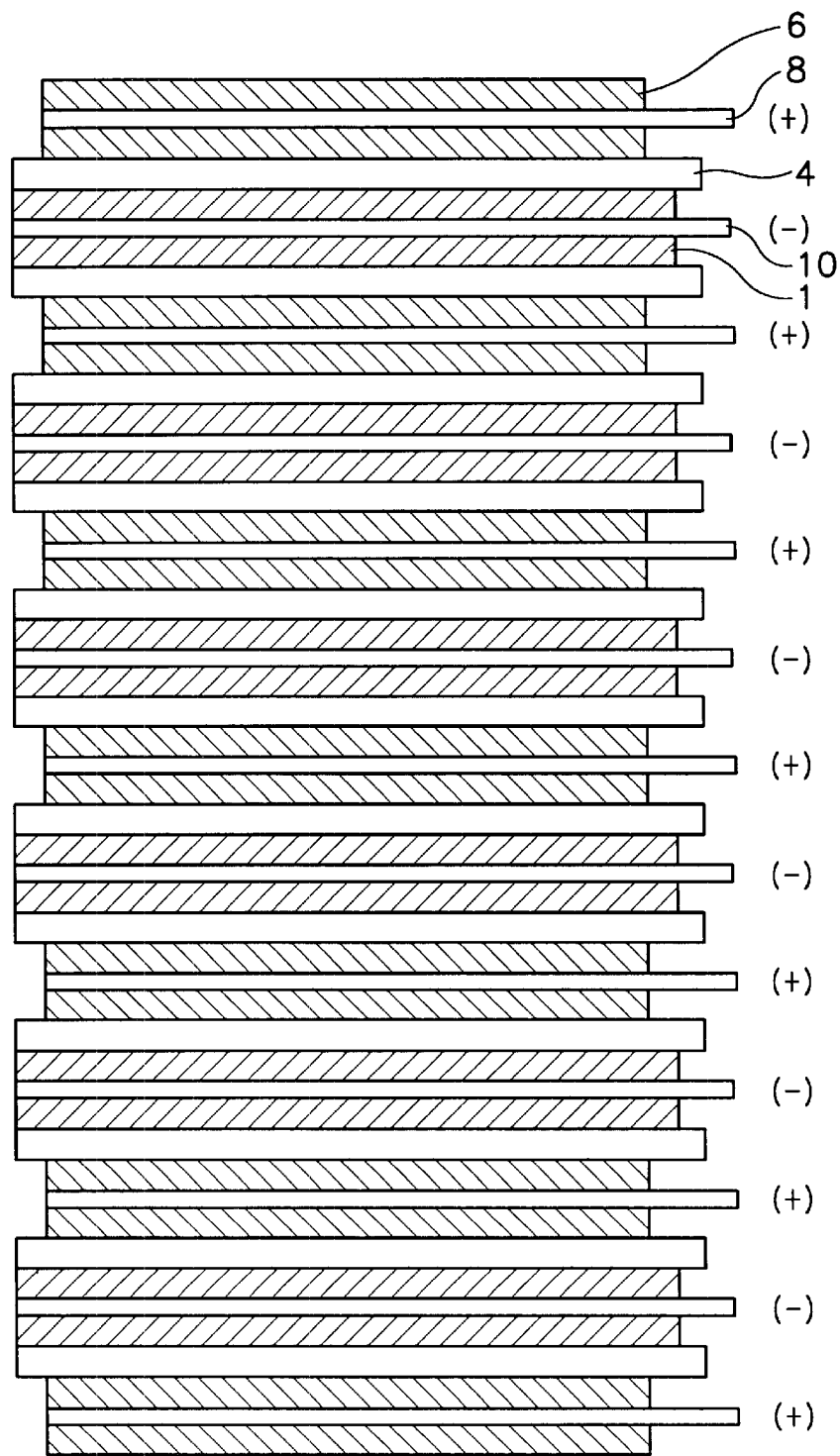
FIG. 3 is a schematic diagram for showing a lithium secondary battery having a multi-layered structure manufactured by an embodiment of the present invention.

Referring to FIGS. 1–3, a lithium secondary battery includes an anode 1, a polymer electrolyte 4 and a cathode 6. The cathode 6 is commonly manufactured from lithium metal oxide to a current collector, aluminum foil 8. The lithium metal oxide is coated on both sides of aluminum foil 8 to a thickness of 20–100 μm to manufacture the cathode 6.

The anode 1 is manufactured by coating commonly used lithium metal to both sides of a current collector, copper foil 10 to a thickness of 25–50 μm. Between the cathode 6 and anode 1, a polymer electrolyte 4 is provided.

As illustrated in the drawings, the size of anode 1 is larger than that of cathode 6 so as to avoid a generation of an electric short attributed by a contact of both electrodes during integration. It is no concern that any electrode of anode 1 or cathode 6 is larger, however, it is preferred that anode 1 is larger than cathode 6.

A lithium secondary battery of a unit cell structure in which the anode 1 and cathode 6 are attached on both sides of the polymer electrolyte 4 is manufactured by providing the polymer electrolyte 4 between the anode 1 and cathode 6. In FIG. 2, current collector of the cathode 8 and anode 10 are illustrated. By integrating a plurality of unit cells illustrated in FIG. 2, a multi-layered cell illustrated in FIG. 3 can be obtained. The structure of a cathode, polymer electrolyte and anode is repeated and the outermost polymer electrolyte is removed to form the multi-layered cell. At the outermost portion of the cell, the cathode can be provided as illustrated in FIG. 3 otherwise the anode can be provided.

The polymer electrolyte has enough mechanical strength to control the cathode and the anode which are on both sides of the polymer electrolyte not to contact at the multi-layered cell. In addition, the polymer electrolyte has an appropriate adhesiveness to the electrodes so that a homogeneous adhesion of the polymer electrolyte with the electrode can be accomplished. According to the optimized method of the present invention, a polymer electrolyte having an optimized mechanical strength and adhesiveness can be obtained.

A liquid electrolyte is added to the electrode and electrolyte of the formed cell in order to improve a highly efficient discharging characteristic, in particular, the discharging characteristic at a low temperature. For adding the liquid electrolyte, the cell is dipped into the liquid electrolyte under an atmospheric pressure for a time period of about a minute–2 hours. If the dipping time is longer than 2 hours, the polymer electrolyte absorbs an excessive amount of the liquid electrolyte and the cell is expanded. Accordingly, the thickness of the cell is increased. Furthermore, an excessive amount of the liquid electrolyte is present between the polymer electrolyte and the electrode to generate a non-uniform adhesion between them. This lessens the lifetime of the battery.

If the dipping time is shorter than a minute, the cell is impregnated with too small amount of the liquid electrolyte, and the ion transmitting characteristic of the cell is deteriorated. Accordingly, the preferred dipping time under the atmospheric pressure is in the range of about a minute–2 hours.

Alternately, the cell is dipped into the liquid electrolyte under vacuum condition for a shorter time of about 30 seconds–30 minutes. When the dipping is implemented under the vacuum condition, the dipping time can be reduced. However, if the dipping under the vacuum condition exceeds 30 minutes, an electrolyte having a low viscosity evaporates to increase the viscosity of the electrolyte impregnated into the cell. This lowers the performance of the cell at a low temperature.

Other than the dipping method, an appropriate amount of the liquid electrolyte can be injected into a case during a packaging process of the cell. As for the solvent, ethylene carbonate, propylene carbonate, diethyl carbonate, dimethyl carbonate, ethyl methyl carbonate, gamma-caprolactone or a mixture thereof along with at least one salt of lithium perchlorate ($LiClO_4$), lithium trifluoromethane sulfonate ($LiCF_3SO_3$), lithium borofluoride ($LiBF_4$), lithium hexafluorophosphate ($LiPF_6$) and lithium arsenic hexafluoride ($LiAsF_6$) can be used. This solvent can be different from the solvent used for preparing the polymer electrolyte.

Preferably, the solvent used for preparing the polymer electrolyte is selected with consideration to the mechanical strength and the adhesiveness of the electrolyte, while the additionally injected solvent is selected with consideration to a high capacitance and performance at high and low temperatures of the battery.

After that, a unit cell or a multi-layered cell impregnated with the electrolyte is wrapped with the case and is sealed using a vacuum packaging apparatus. Through the vacuum packaging, a uniform adhesion of the electrode with the polymer electrolyte can be maintained. The time needed for the packaging is within 30 seconds. If the vacuum packaging time exceeds 30 seconds, the components of the impregnated electrolyte having a low viscosity evaporate to increase the viscosity of the electrolyte. At this time, the performance of the cell at a low temperature is deteriorated.

The preferred embodiments of the present invention with the corresponding comparative examples will be described in detail below. However, it should be understood that the present invention is not limited to the following examples.

EXAMPLE 1

3.5 g of Kynar 2801 (purchased from Atochem Inc.) which was a copolymer, as a polyvinylidene fluoride-based polymer, 0.5 g of Kynar 761 (purchased from Atochem Inc.) as a polyvinylidene fluoride, 1 g of polymethyl methacrylate (purchased from Aldrich Inc.) and 35 g of a mixture solution of ethylene carbonate/dimethyl carbonate/ethyl methyl carbonate (1/0.8/0.5 by weight) in which 1M of $LiPF_6$ was dissolved, were mixed at room temperature for 24 hours. Thus obtained mixture was heated to about 130° C. and stirred for 2 hours. The obtained polymer electrolyte composition was casted onto a molded film by a doctor blade method. The thickness of the casted polymer film was about 50 μm and the toughness of the film was good.

A cathode and an anode are integrated on both sides of the polymer electrolyte. A mixture solution of ethylene carbonate/propylene carbonate/ethyl methyl carbonate (0.4/0.3/0.3 by weight) in which 1M of $LiPF_6$ was dissolved, was additionally injected into the cell and the cell was vacuum packaged to complete the cell.

COMPARATIVE EXAMPLE 1

A cell was manufactured by the same method described in Example 1, except that the mixture was stirred at room temperature for 24 hours and then heated to 110° C. and stirred for 7 hours.

EXAMPLE 2

3.5 g of Kynar 2801 (purchased from Atochem Inc.) which was a copolymer, as a polyvinylidene fluoride-based polymer, 0.5 g of Kynar 761 (purchased from Atochem Inc.) as a polyvinylidene fluoride, 1 g of polymethyl methacrylate (purchased from Aldrich Inc.) and 35 g of a mixture solution of ethylene carbonate/dimethyl carbonate/ethyl methyl carbonate (1/0.8/0.5 by weight) in which 1M of $LiPF_6$ was dissolved, were mixed at room temperature for 24 hours. The obtained mixture was heated to about 140° C. and stirred for 3 hours. The obtained polymer electrolyte composition was casted onto a molded film by a doctor blade method. The thickness of the casted polymer film was about 50 μm. The polymer electrolyte after the casting had a high adhesiveness, however, did not have a very strong mechanical strength.

The film was stood for 30 minutes at room temperature and a cathode and an anode were attached on both sides of the film to manufacture a unit cell. A mixed solution of ethylene carbonate/propylene carbonate/ethyl methyl carbonate (0.4/0.3/0.3 by weight) in which 1M of $LiPF_6$ was dissolved, was additionally injected into the cell and the cell was vacuum packaged to complete the cell. The time for vacuum packaging was 10 seconds.

COMPARATIVE EXAMPLE 2

A cell was manufactured by the same method described in Example 2, except that the polymer electrolyte composition was coated onto the molded film immediately after the cathode and anode were attached onto both sides of the polymer electrolyte.

EXAMPLE 3

3.5 g of Kynar 2801 (purchased from Atochem Inc.) which was a copolymer, as a polyvinylidene fluoride-based polymer, 0.5 g of Kynar 761 (purchased from Atochem Inc.) as a polyvinylidene fluoride, 1 g of polymethyl methacrylate (purchased from Aldrich Inc.) and 35 g of a mixture solution of ethylene carbonate/dimethyl carbonate/ethyl methyl carbonate (1/0.8/0.5 by weight) in which 1M of $LiPF_6$ was dissolved, were mixed at room temperature for 24 hours. The obtained mixture was heated to about 130° C. and stirred for 2 hours. The obtained polymer electrolyte composition was casted onto a molded film by a doctor blade method. The thickness of the casted polymer film was about 50 μm and the toughness of the polymer film was good.

The film stood for 30 minutes at room temperature and a cathode and an anode were attached on both sides of the film to manufacture a unit cell. The cell was dipped into a mixed solution of ethylene carbonate/propylene carbonate/ethyl methyl carbonate (0.4/0.3/0.3 by weight) in which 1M of $LiPF_6$ was dissolved for 20 minutes. The cell was vacuum packaged to complete the cell and it took 10 seconds to do the vacuum packaging.

COMPARATIVE EXAMPLE 3

A cell was manufactured by the same method described in Example 3, except that the dipping time of the cell was 2 hours.

EXAMPLE 4

3.5 g of Kynar 2801 (purchased from Atochem Inc.) which was a copolymer, as a polyvinylidene fluoride-based polymer, 0.5 g of Kynar 761 (purchased from Atochem Inc.) as a polyvinylidene fluoride, 1 g of polymethyl methacrylate (purchased from Aldrich Inc.) and 35 g of a mixture solution of ethylene carbonate/dimethyl carbonate/ethyl methyl carbonate (1/0.8/0.5 by weight) in which 1M of $LiPF_6$ was dissolved, were mixed at room temperature for 24 hours. Thus obtained mixture was heated to about 130° C. and stirred for 2 hours. Thus obtained polymer electrolyte composition was casted onto a molded film by a doctor blade method. The thickness of the casted polymer film was about 50 μm and the toughness of the polymer film was good.

The film stood for 30 minutes at room temperature and a cathode and an anode were attached on both sides of the film to manufacture a unit cell. The cell was dipped into a mixed solution of ethylene carbonate/propylene carbonate/ethyl methyl carbonate (0.4/0.3/0.3 by weight) in which 1M of $LiPF_6$ was dissolved for 5 minutes. The cell was vacuum packaged to complete the cell and it took 10 seconds to do the vacuum packaging.

COMPARATIVE EXAMPLE 4

A cell was manufactured by the same method described in Example 4, except that the vacuum time was 35 seconds.

The test results of the performance of the examples and the comparative examples will be described with reference to attached FIGS. 4–7.

Figure 4:
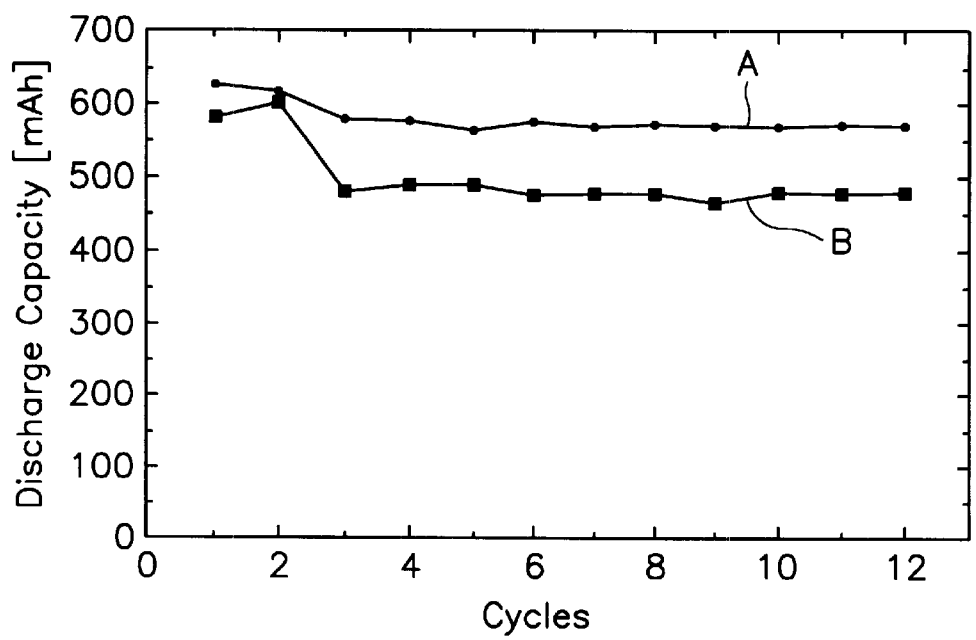
FIG. 4 illustrates graphs for showing discharge capacities according to battery cycles of lithium secondary batteries manufactured by Example 1 and Comparative Example 1.

FIG. 4 illustrates graphs for showing discharge capacities according to battery cycles of lithium secondary batteries manufactured by Example 1 and Comparative Example 1. Graph A corresponds to Example 1 and graph B corresponds to Comparative Example 1. Until the second cycles, the batteries were charged/discharged by 0.2C rate and after that, charged/discharged by 1C rate. The capacities of the cells were 550 mAh. Each cell was charged by a static current mode for each rate of 0.2C and 1C to 4.2V and then, charged by a static potential mode while keeping the voltage of 4.2V. Then, each cell was discharged to 3V by a static current mode for each rate of 0.2C and 1C.

When comparing two graphs A and B, the discharge capacities at 0.2C rate were similar and it was about 600 mAh. However, when each cell was discharged by a high current of 1C rate, the discharge capacity at graph A was about 550 mAh or more while that at graph B was about 500 mAh. The discharge capacity was reduced to about 50 mAh for the cell manufactured by Comparative Example 1.

From this result, it is confirmed that more homogeneous polymer electrolyte film is manufactured and even better cell having higher efficient discharge characteristic is manufactured by the method described in Example 1 in which the mixture was stirred at 130° C. for 2 hours. In comparative Example 1, the mixture was stirred at 110° C. for 7 hours. The mixture containing the electrolyte components was stirred too long at a lower temperature in Comparative Example 1, so a portion including an excessive amount of polymer exists and this portion functions as a barrier of an ion transmission to increase a resistance of the electrolyte.

Figure 5:
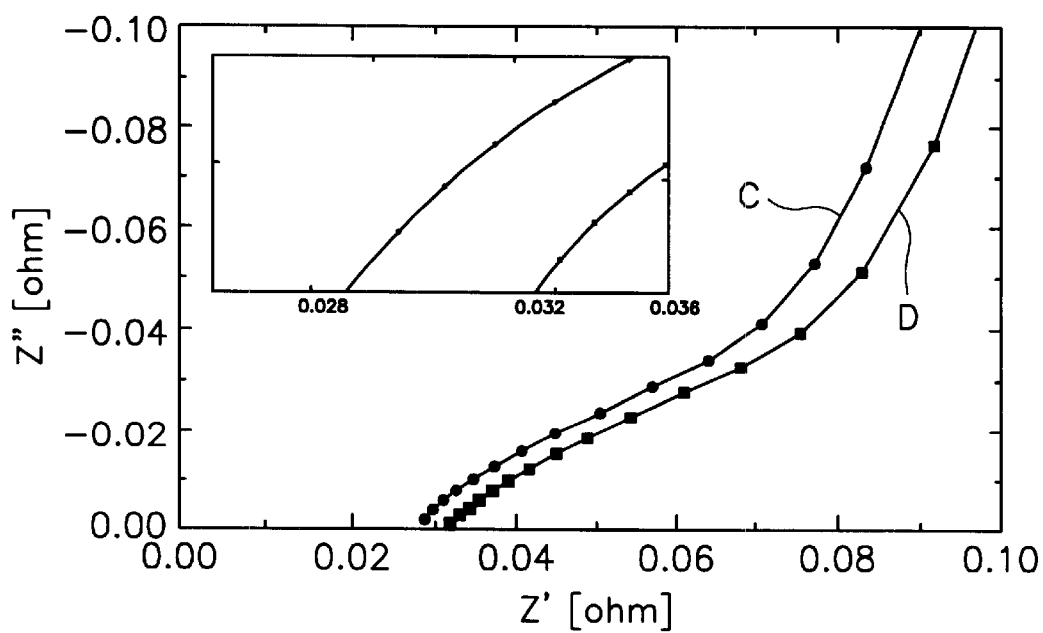
FIG. 5 illustrates graphs for showing AC impedance characteristics according to frequencies of cells of lithium secondary batteries manufactured by Example 1 and Comparative Example 1.

FIG. 5 illustrates graphs for showing AC impedance characteristics according to frequencies of cells of lithium secondary batteries manufactured by Example 1 and Comparative Example 1. Graph C corresponds to Example 1 and graph D corresponds to Comparative Example 1. The resistance of the polymer electrolyte was measured as 31.7mΩ for graph D and 28.8mΩ for graph C. From this result, the resistance of the electrolyte manufactured by the method described in Example 1 is lower than that manufactured by the method described in Comparative Example 1.

Figure 6:
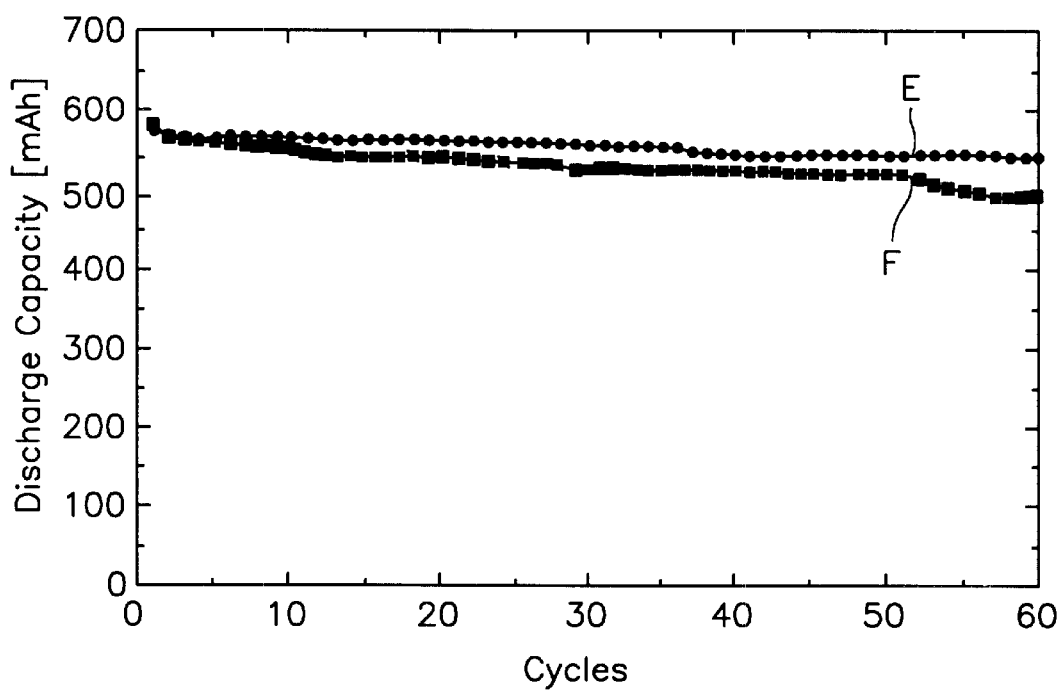
FIG. 6 illustrates graphs for showing discharge capacities at 1C rates according to the progresses of battery cycles of lithium secondary batteries manufactured by Example 2 and Comparative Example 2.

FIG. 6 illustrates graphs for showing discharge capacities at 1C rates according to the progresses of battery cycles of lithium secondary batteries manufactured by Example 2 and Comparative Example 2. Graph E corresponds to Example 2 and graph F corresponds to Comparative Example 2. From the graphs, the cell manufactured by the method described in Example 2 in which a drying process was implemented after coating a polymer electrolyte composition to a molded film exhibits better discharge capacity than that manufactured by the method described in Comparative Example 2.

The polymer electrolyte compositions manufactured by Example 2 and Comparative Example 2 exhibit too strong adhesiveness, therefore an impregnation of additional liquid electrolyte into the electrodes is very difficult. The drying process implemented in Example 2 after the coating, lessens the adhesiveness of the polymer electrolyte a little for an effective impregnation of the liquid electrolyte into the electrodes.

Figure 7:
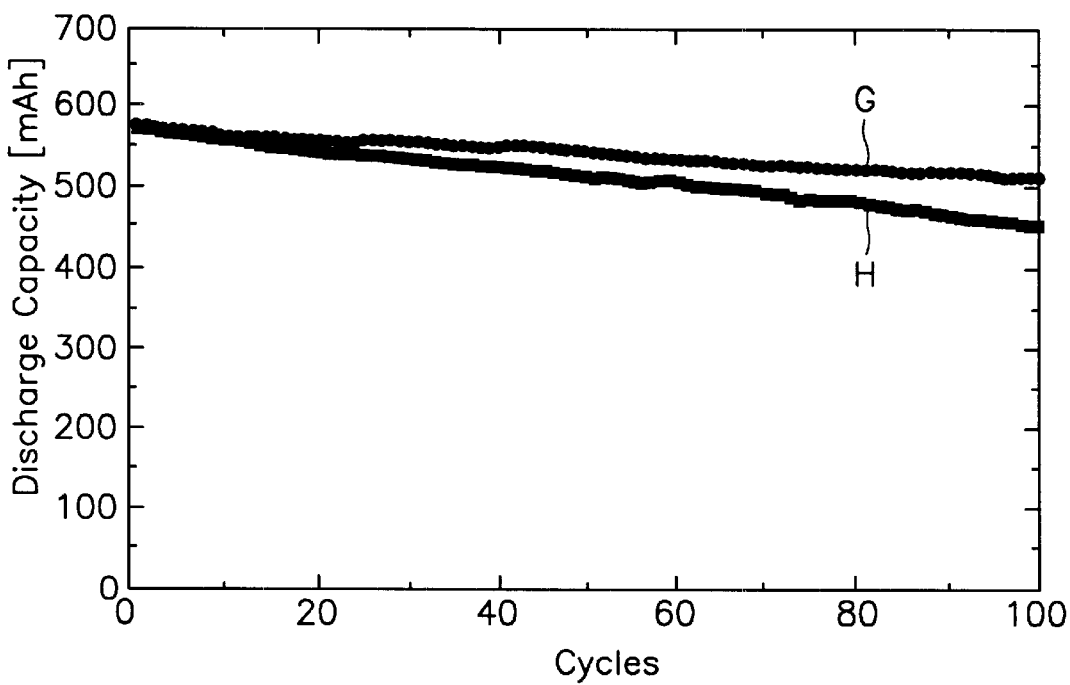
FIG. 7 illustrates graphs for showing discharge capacities according to the cell cycles of lithium secondary batteries manufactured by Example 3 and Comparative Example 3.

FIG. 7 illustrates graphs for showing discharge capacities according to the cell cycles of lithium secondary batteries manufactured by Example 3 and Comparative Example 3. Graph G corresponds to Example 3 and graph H corresponds to Comparative Example 3. The charging/discharging ratio was 1C rate. The cell manufactured by the method described in Comparative Example 3 in which an excessive amount of the liquid electrolyte was impregnated, swelled. Therefore, the adhesive power between the electrodes and the polymer electrolyte is weakened.

In graph G, about 90% or over of an initial discharge capacity was measured at 100 cycles, however, in graph H, about 80% of the initial discharge capacity was measured at 100 cycles. It is understood that the adhesive power between the electrodes and the polymer electrolyte of the cell manufactured from Comparative Example 3 is weak, and according to the progress of the cycle, a portion of the polymer electrolyte is separated from the electrolyte.

Figure 8:
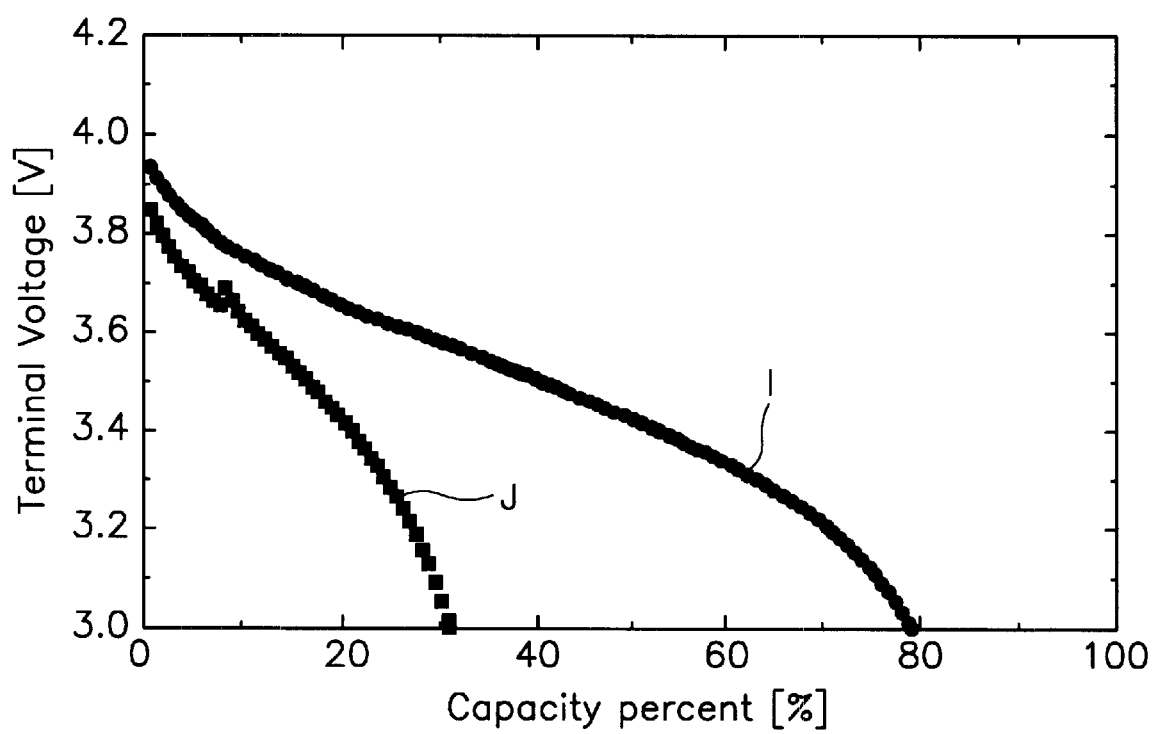
FIG. 8 illustrates graphs for showing voltage curves obtained when charging to 4.2V by 0.2C rate at room temperature then discharging to 3V by 0.2C rate at −10° C. lithium secondary batteries manufactured by Example 4 and Comparative Example 4.

FIG. 8 illustrates graphs for showing voltage curves obtained by charging to 4.2V by 0.2C rate at room temperature then discharging to 3V by 0.2C rate at $-10°$ C. lithium secondary batteries manufactured by Example 4 and Comparative Example 4. Graph l corresponds to Example 4 and graph J corresponds to Comparative Example 4. At $-10°$ C., the discharge capacity was measured to be about 80% of that at room temperature for graph l, however, it was about 32% for graph J. It is understood that if the vacuuming time during the vacuum packaging is too long, electrolyte having a low viscosity evaporates to increase the remaining electrolyte in the cell. This lowers the performance of the cell at low temperature.

As described above, a polymer electrolyte composition is prepared by using polyvinylidene fluoride-based polymer which has good mechanical strength and polyacrylate-based polymer which has good adhesiveness and by using optimized conditions. A polymer electrolyte manufactured by this composition has an improved mechanical strength and adhesiveness.

Therefore, a lithium secondary battery employing this polymer electrolyte exhibits a stable charge/discharge characteristic and has a high capacity. In addition, the adhesiveness of the polymer electrolyte with a liquid electrolyte is good and a leakage and evaporation of the liquid electrolyte can be minimized. Furthermore, the polymer electrolyte can be applied as an electrolyte of a capacitor, a sensor, etc.

While the present invention is described in detail referring to the attached embodiments, various modifications, alternate constructions and equivalents may be employed without departing from the true spirit and scope of the present invention.

What is claimed is:

1. A method of manufacturing a lithium secondary battery comprising the steps of:

mixing a) a polymer mixture including polyvinylidene fluoride-based polymer and b) at least one polymer selected from the group consisting of polyacrylonitrile and polymethyl methacrylate with a solvent in which a lithium salt is dissolved, said polymer mixture and said solvent being mixed in a mixing ratio of 1:3–10;

stirring thus obtained first mixture at room temperature for a time period of about 1–48 hours;

heating thus obtained second mixture at a temperature range of about 60–250° C. for a time period of about 5 minutes–6 hours while stirring to prepare a polymer electrolyte composition;

coating thus obtained polymer electrolyte composition on a molded film and then drying, and separating the dried electrolyte composition from the molded film to form a polymer film;

attaching one of a cathode and an anode between two polymer films, thereby forming a resulting structure, and impregnating the resulting structure with a liquid electrolyte for a time period of about 1 minute–2 hours under atmospheric pressure.

2. A method of manufacturing a lithium secondary battery as claimed in claim 1, further comprising a step of vacuum packaging a cell obtained by sequentially integrating at least one of a cathode and an anode, the polymer film and a remaining electrode of said cathode and anode, in a case having a vacuum of about 30 seconds after said drying.

3. A method of manufacturing a lithium secondary battery as claimed in claim 1, wherein said drying is implemented at a temperature range of room temperature $-60°$ C. for 1 minute–1 hour.

4. A method of manufacturing a lithium secondary battery as claimed in claim 1, wherein said polymer electrolyte composition is coated on said substrate to a thickness range of about 20–100 $\mu$m.

5. A method of manufacturing a lithium secondary battery comprising the steps of:

mixing a) a polymer mixture including polyvinylidene fluoride-based polymer and b) at least one polymer selected from the group consisting of polyacrylonitrile and polymethyl methacrylate with a solvent in which a lithium salt is dissolved, said polymer mixture and said solvent being mixed in a mixing ratio of 1:3–10;

stirring thus obtained first mixture at room temperature for a time period of about 1–48 hours;

heating thus obtained second mixture at a temperature range of about 60–250° C. for a time period of about 5 minutes–6 hours while stirring to prepare a polymer electrolyte composition;

coating thus obtained polymer electrolyte composition on a molded film and then drying, and separating the dried electrolyte composition from the molded film to form a polymer film;

attaching one of a cathode and an anode between two polymer films, thereby forming a resulting structure, and impregnating the resulting structure with a liquid electrolyte for a time period of about 30 seconds–30 minutes under a lower pressure than atmospheric pressure after said drying.

* * * * *